Figure 1:
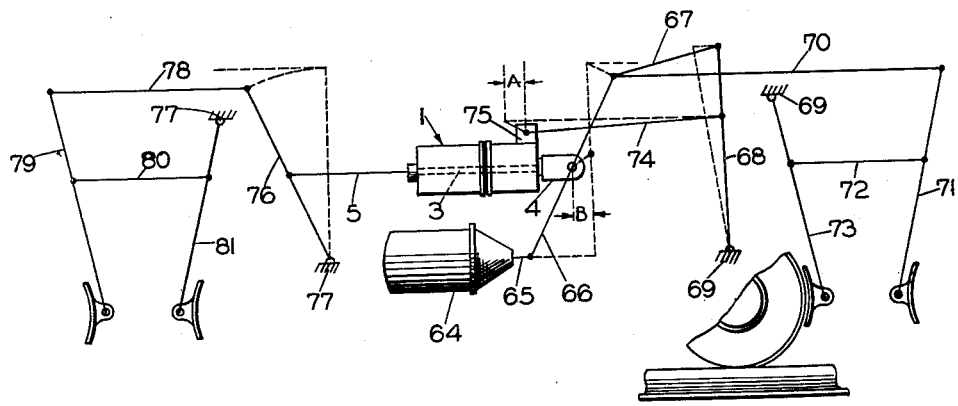

March 7, 1961 G. K. NEWELL 2,973,840
DOUBLE-ACTING SLACK ADJUSTER
Filed July 23, 1958 2 Sheets-Sheet 1

INVENTOR.
GEORGE K. NEWELL
BY Henry E. Otts Jr
ATTORNEY

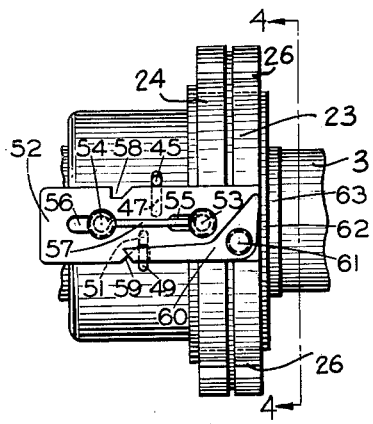
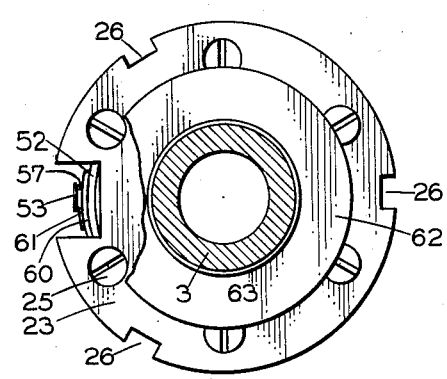
FIG-3  FIG-4
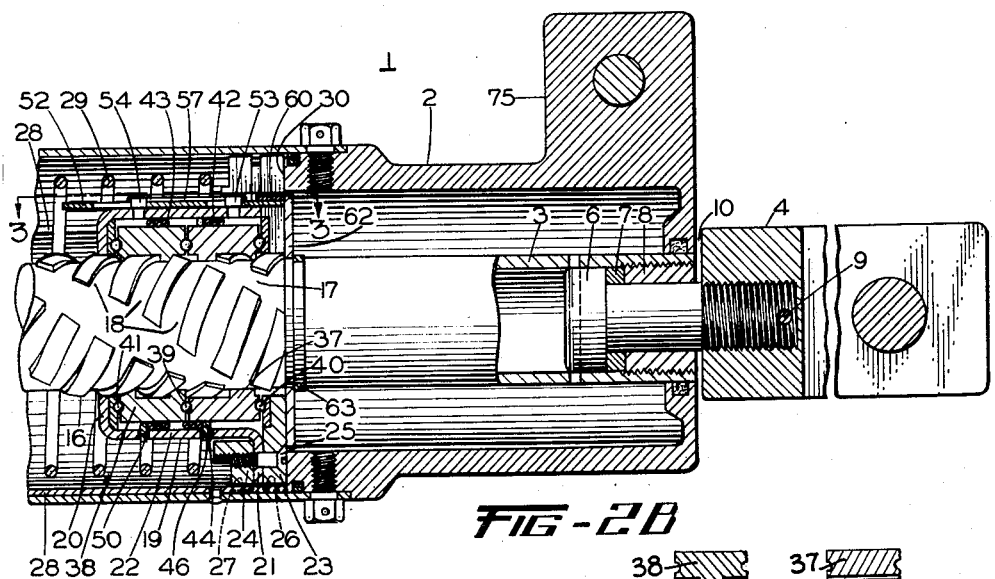
FIG-2B
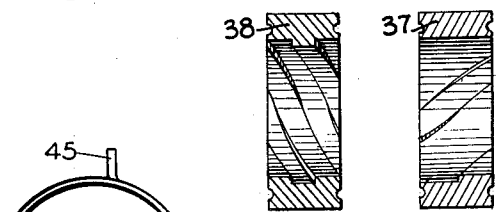
FIG-9  FIG-10
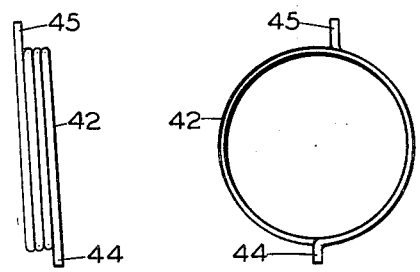
FIG-7  FIG-8
INVENTOR.
GEORGE K. NEWELL
BY Henry E. Otto
ATTORNEY

United States Patent Office 2,973,840
Patented Mar. 7, 1961

2,973,840

DOUBLE-ACTING SLACK ADJUSTER

George K. Newell, Trafford, Pa., assignor to Westinghouse Air Brake Company, Wilmerding, Pa., a corporation of Pennsylvania Filed July 23, 1958, Ser. No. 750,407

13 Claims. (Cl. 188—196)

This invention relates to brake rigging embodying slack adjusters and more particularly to an improved double-acting mechanically actuated slack adjuster automatically operative to take up or let out slack in the brake rigging of railway cars according to whether slack clearance between the brake shoes and railway car wheels is excessive or insufficient, respectively, and also manually operable, when brakes are fully released, to adjust slack to facilitate replacement of worn brake shoes.

According to the invention, there is provided an improved slack adjuster comprising a non-rotatable push rod that is screw-thread connected to a rotatable member such that rotation of said member will displace said push rod axially to vary slack, said rotatable member having oppositely wound external helical threads on which are spinnably mounted a let-out nut and a take-up nut, respectively, that are controlled by a non-rotatable longitudinally movable runner means which is biased by a power spring to a release position defined by contact with a stop carried by said rotatable member. When respective clutches for the let-out nut and take-up nut are selectively effectively engaged during release of a brake application, the corresponding nut will be prevented from spinning on the rotatable member and will thus cause rotation of the latter one way or the opposite way according to which of the clutches is engaged. A cam plate carried by and movable longitudinally relative to the runner means controls effective engagement of said clutches.

During an application of brakes, the runner means and cam plate will move relatively toward the push rod and against the force of the power spring until the brake shoes are engaged. If slack is insufficient, such movement of the runner means will be insufficient to carry the cam plate into contact with a changeover means carried by the rotatable member; if slack is within a normal range, the cam plate will be shifted not more than a slight distance relative to the runner means by contact with said changeover means; and if slack is excessive, the cam plate will be so shifted more than said slight distance.

The slack adjuster is conditioned to let out slack, not vary slack, or take up slack during release of a brake application according to whether, during the preceding brake application, said cam plate did not engage said changeover means, or was shifted thereby less than or more than said slight distance, respectively.

Since with brakes fully released the cam plate holds the take-up clutch disengaged but is ineffective to prevent engagement of the let-out clutch, a latch is preferably provided and rockably carried by the cam plate such that, when brakes are fully released, said latch will engage the above-mentioned stop and thus hold the let-out clutch disengaged. With this desirable arangement, the rotatable member may thus be freely rotated in either direction to manually take up and let out slack while brakes are fully released.

Figure 2A:
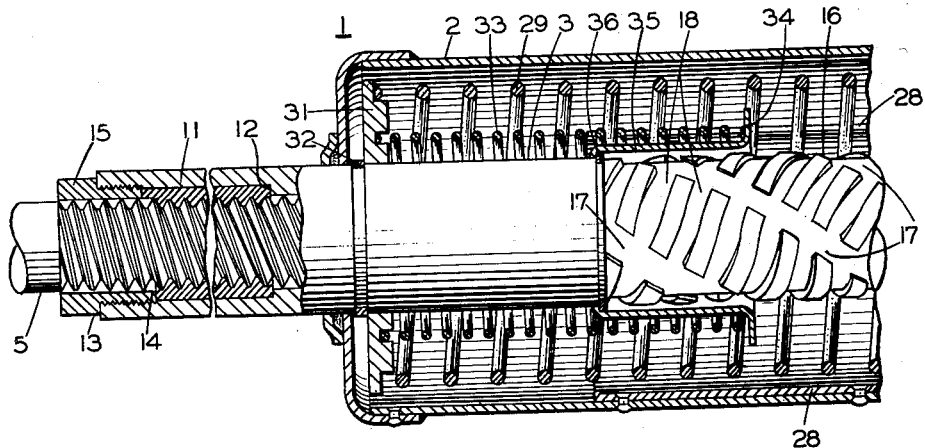
Figures 5, 6:
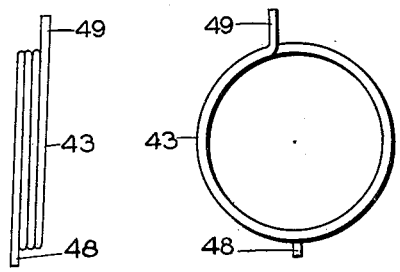

In the accompanying drawings, Fig. 1 is a schematic view of a railway car brake rigging including a slack adjuster embodying the invention; Figs. 2A and 2B, when taken together such that the right-hand end of Fig. 2A is matched with the left-hand end of Fig. 2B, constitute a longitudinal sectional view of the slack adjuster shown in outline in Fig. 1; Fig. 3 is a view taken along the line 3—3 of Fig. 2B, with an encircling power spring and housing removed for sake of clarity; Fig. 4 is a view, partly cut away, taken along the line 4—4 of Fig. 3; Fig. 5 is a side elevational view of a let-out spring clutch shown in section in Fig. 2B; Fig. 6 is an end view of said spring clutch as viewed from the right-hand end of Fig. 5; Fig. 7 is a side elevational view of a take-up spring clutch shown in section in Fig. 2B; Fig. 8 is an end view of the latter clutch as viewed from the right-hand end of Fig. 7; and Figs. 9 and 10 are section views of a let-out nut and a take-up nut, respectively, removed from the rotatable tube on which they are shown mounted in Fig. 2B.

Description

As shown in the drawings, a slack adjuster device 1 embodying the invention comprises a hollow, sectionalized, generally cylindrical non-rotatable housing 2 which encircles and is axially movable relative to a rotatable tube 3 that at one end is so secured to a clevis 4 as to be axially movable thereby and at the other end has operative screw-threaded engagement with a non-rotatable push rod 5 that is movable axially relative to the tube whenever the latter is rotated.

The rotatable tube 3 may be connected to the non-rotatable clevis 4 by any suitable means, such as a bolt 6 having a head which is disposed within the tube and bears against a thrust washer or bearing 7 that encircles the shank of the bolt and is held in place by an externally threaded shank-encircling nut 8 screw-threaded into one end of the tube; said clevis being screw-threaded onto said shank and staked thereto by a transverse pin 9. With this arrangement, and in view of the clearance provided at 10, the tube 3 may rotate freely relative to the clevis 4 but will be moved axially by and with the clevis.

The operative screw-threaded connection between the tube 3 and push rod 5 may be effected, for example, by means of a non-rotatable internally threaded nut 11 which is held against a shoulder 12 within the tube 3 by a threaded collar 13 having a plurality of circumferentially spaced lugs 14 that extend into recesses or slots in the outer end of nut 11 to prevent rotation of said nut; said collar having a wrench-engageable flange 15 which is welded to the end of said tube. Thus, the push rod 5 will be moved axially inward or outward relative to the nut 11 and hence tube 3 according to the direction of rotation of said tube. If preferred, the tube 3 itself may be provided with internal screw threads for directly engaging the threads on the push rod 5, in which case a wrench-engageable flange would preferably be provided adjacent the outer end of the tube to permit manual rotation of the tube to effect manual adjustment of slack in the manner hereinafter to be described.

A portion 16 of tube 3 which is disposed within housing 2 is provided with two sets of external, preferably triple, helical grooves or threads 17, 18 of square cross-section. The take-up threads 17 are right-hand threads, as viewed from clevis 4, and have a long lead of such as about 9¾ inches; whereas the let-out threads 18 are left-hand threads, as so viewed, and have a substantially shorter lead of such as about two inches.

About this threaded tube portion 16 is mounted a preferably stamped runner shell 19 providing annular flanges 20, 21 that extend radially inward and outward, respectively, from opposite ends of a cylindrical portion 22. Flange 21 is clamped between annular end plates 23, 24, such as by screws 25. The shell 19 and the end plates 23, 24 constitute a runner assemblage which is prevented from rotating relative to the housing 2 but axially slidable relative to said housing by means of a spline-like connection therebetween; said connection may be afforded by providing circumferentially spaced notches 26, 27 in the outer periphery of the end plates 23, 24, respectively, which notches straddle corresponding longitudinally extending guide strips or tracks 28 secured to the inner walls of housing 2.

A main power spring 29 contained in housing 2 bears at one end against plate 24 for biasing plate 23 of the runner assemblage into contact with a stop shoulder 30 provided by said housing; and the other end of said spring bears against an annular spring plate 31 that surrounds tube 3 and is backed up by a snap-type retaining ring 32 accommodated in a circumferential groove in said tube. Another lighter spring 33 is arranged concentrically within spring 29 and bears against the spring plate 31 and against an outwardly extending radial flange 34 of a tube-encircling changeover member 35 that has an inwardly directed flange which normally is biased by the force of spring 33 into contact with a snap-type retaining ring 36 mounted about tube 3.

Within the annular space between shell portion 22 and tube portion 16 are disposed two adjusting nuts 37, 38 which are held in alignment and enabled to freely rotate relative to each other and relative to the end plates by three sets of ball thrust bearings 39, 40, 41, respectively, arranged in rings. Inasmuch as the forces and rotational speeds are low, the races for these ball bearings 39 and the inner races for bearings 40, 41 may be machined or molded in the nuts 37, 38; however, if preferred, cages of thrust bearings may be used.

The take-up nut 37 and let-out nut 38 are internally threaded so as to mate with the take-up threads 17 and let-out threads 18, respectively. These nuts 37, 38 also have smooth cylindrical outer surfaces which are surrounded by spring clutches 42, 43, respectively, (Figs. 5 through 8); each of said clutches being wound slightly smaller in diameter than the respective nut it encircles so that each of said spring clutches will be expanded slightly upon insertion of the nuts therein and thereby insure positive contact between the spring coils and said outer surfaces. The take-up spring clutch 42 is wound counterclockwise (Fig. 8) and has at its respective ends an anchor tang 44 and a live tang 45 that always extend radially into a hole 46 and through a slot 47 (Fig. 3), respectively, in shell portion 22; whereas the let-out spring clutch 43 is wound clockwise (Fig. 6) and has an anchor tang 48 and a live tang 49 which always project radially into a hole 50 and through a slot 51 (Fig. 3), respectively, in said shell portion.

It will now be apparent that take-up nut 37 is always rotatable clockwise (as viewed from clevis 4) within its spring clutch 42 with only slight frictional resistance because this direction of rotation tends to unwrap or loosen the coils of said clutch; whereas counterclockwise rotation of nut 37 is prevented, unless said clutch is held disengaged, due to prompt wrap-up of the coils of said clutch which frictionally contact the outer surface of said nut. Conversely, the let-out nut 38 is always rotatable counterclockwise within its spring clutch 43 (as viewed from clevis 4) but will be locked by said clutch against clockwise rotation unless said clutch is held disengaged. These clutches 42, 43 will act instantaneously and without measurable lost motion.

A cam plate 52 is provided for controlling engagement and disengagement of the spring clutches 37, 38. This plate 52 is disposed in aligned slots formed in the outer periphery of the runner assemblage 19, 23, 24 and is slidably attached to the exterior of shell portion 22 by means of stepped rivets 53, 54 which pass through longitudinally elongated slots 55, 56 in said cam plate and through holes in said shell portion and are pinned to the inner wall of said shell portion; said slots serving to limit the degree of longitudinal sliding movement of the cam plate relative to the shell 19. A friction spring 57 is provided for limiting the ease of such sliding movement and may comprise a short piece of spring wire looped at each end about the respective rivets 53, 54 under the enlarged heads thereof and initially curved slightly at its central portion so as to bear against the cam plate 52 so as to "brake" the latter against undesired sliding.

Two beveled notches 58, 59 are formed in opposite sides of the cam plate 52 and offset transversely with respect to each other for reasons which will hereinafter become apparent. A bell-crank-like latch 60 is rockably supported at its knee on a stepped rivet 61 carried by the cam plate 52. When one arm of latch 60 engages a stop disc 62, the other arm of said latch will be rocked and prevent the live tang 49 of let-out clutch spring 43 from entering the notch 59 when said tang and notch are transversely aligned. The stop disc 62 encircles tube 3 and is held between a shoulder adjacent the threaded tube portion 16 and a snap-type retaining ring 63 so as to be movable axially by and with said tube.

Referring now to Fig. 1, a brake cylinder 64 has a piston rod 65 which is pivotally connected to one end of a live lever 66 that is hingedly connected intermediate its ends to the clevis 4. The other end of live lever 66 is pivotally connected by a link 67 to one end of a control lever 68 that at its opposite end is hingedly fulcrumed on a fixed member 69; and said other end of live lever is also pivotally connected to a tie rod 70 which is pivotally connected to a brake-shoe-carrying brake lever 71 that through a link 72 is connected to another brake-shoe-carrying brake lever 73 which is hingedly fulcrumed on fixed member 69, for controlling frictional braking engagement of the brake shoes with respective wheels of one truck to be braked. Intermediate its ends live lever 68 is pivotally connected to a pull or tie rod 74 which, in turn, is pivotally connected to a lug 75 on the housing 2 for effecting longitudinal movement of said housing while preventing rotation thereof.

A dead lever 76 is hingedly fulcrumed at one end on a fixed member 77, pivotally connected intermediate its ends to push rod 5, and pivotally connected at the opposite end to a tie rod 78 which, in turn, is pivotally connected to a brake-shoe-carrying brake lever 79 that is connected by a link 80 to another brake-shoe-carrying brake lever 81 for controlling engagement of such brake shoes with corresponding wheels of the other truck.

*Operation*

Assume initially that the brake cylinder 64 is devoid of fluid under pressure. Under this condition, the various parts will be in the relative positions in which they are shown in the drawings. In the slack adjuster 1, the runner assemblage 19, 23, 24 will be in a rightmost position defined by contact of end plate 23 with shoulder 30, due to the force of power spring 29; the cam plate 52 and latch 60 will engage the stop disc 62; said latch will have been rocked counterclockwise about rivet 61 for forcibly holding the live tang 49 of let-out spring clutch 43 out of notch 59 in the cam plate and thus unwrapping or disengaging said clutch; and the live tang 45 of take-up spring clutch 42 will be out of alignment with cam plate notch 58 and the latter clutch thus held unwrapped or disengaged by contact with a part of said cam plate adjacent notch 58.

Thus, under the assumed condition, both clutches 42, 43 will be disengaged and both nuts 37, 38 will therefore be free to rotate clockwise and counterclockwise. Hence, when the brake cylinder 64 is devoid of fluid under pressure, a wrench may be applied to the wrench-engageable flange 15 of collar 13 for so rotating the tube 3 as to screw the push rod 5 inward or outward of said tube and thereby manually take up or let out slack in the brake rigging, respectively. Thus, as the effective length of screw-thread-connected push rod 5 and tube 3 is reduced and increased, slack will be proportionately reduced and increased.

As viewed in Fig. 1, during a brake application, pressure of fluid supplied to brake cylinder 64 will cause piston rod 65 to move rightward and, in turn, cause the live lever 66 to pull clevis 4 and thereby tube 3 rightward and at the same time rock counterclockwise relative to said clevis and, through link 67 and control lever 68 and tie rod 74, immediately begin to shift lug 75 and hence housing 2 leftward relative to said clevis and tube against the force of power spring 29. This movement of live lever 66 will also shift tie rod 70 leftward for operatively causing engagement of the brake shoes controlled by said tie rod. Meanwhile, the push rod 5 and spring 33 and changeover member 35 will be pulled rightward by the tube 3; and such rightward movement of the push rod will rock dead lever 76 for operatively engaging the other brake shoes. The approximate relative positions assumed by the various elements of the brake rigging during a brake application are shown by dash lines; and the total linear displacement of the housing 2 and hence runner assemblage 19, 23, 24 relative to tube 3 during a brake application will be the sum of the distances A and B (Fig. 1), which distances will vary according to slack condition in the rigging.

Referring now to Figs. 2A, 2B, and 3, as the housing 2 moves leftward, the runner assemblage 19, 23, 24 will be shifted correspondingly leftward by shoulder 30 relative to the tube 3. When the runner assemblage is moved a slight distance, such as about 1/8 inch, leftward relative to the tube 3 and hence stop disc 62, the holding force exerted by said stop disc will be removed from the latch 60 and thus permit tang 49 of let-out spring clutch 43 to enter notch 59, for thereby tightening the coils of said clutch; however, due to the above-described manner in which clutch 43 is wrapped, the let-out nut 38 can and will spin counterclockwise (as viewed from clevis 4) in threads 18 during continued leftward movement of the runner assemblage 19, 23, 24. Meanwhile, the take-up clutch 42 will, initially at least, be held disengaged or unwrapped by cam plate 52 acting on live tang 45; and take-up nut 37 will freely spin clockwise (as viewed from clevis 4) in the take-up threads 17 as the runner assemblage 19, 23, 24 moves leftward.

If slack in the brake rigging is insufficient, the brake shoes will be engaged by less than a desired minimum amount of travel of the brake cylinder piston rod 65, which travel will be insufficient to carry the runner assemblage 19, 23, 24 far enough leftward relative to the rightwardly moving tube 3 and changeover member 35 to effect contact of the left-hand end of cam plate 52 with changeover flange 34.

Consequently, when the brake cylinder 64 is subsequently vented, the power stored in the power spring 29 (which has been compressed between the spring plate 31 carried by tube 3 and the end plate 24 of the runner assemblage) will shift the runner assemblage rightward and through contact of shoulder 30 shift the housing 2 correspondingly rightward relative to the tube 3, as soon as tension in the brake rigging is reduced sufficiently. Since let-out clutch 43 is engaged, the let-out nut 38 cannot rotate clockwise; and hence as the runner assemblage moves rightward relative to the leftwardly moving tube 3, said let-out nut will act through the let-out threads 18 to rotate said tube counterclockwise (as viewed from clevis 4) and thus run push rod 5 outwardly of the tube to effect an increase in slack until the end plate 23 of the runner assemblage engages the stop disc 62, whereupon latch 60 will be rocked by contact with said stop disc and push live tang 49 of let-out clutch 43 out of cam plate notch 59 for unwrapping and thus disengaging said clutch.

Meanwhile, under the insufficient slack condition just described, there will be no relative movement between the cam plate 52 and runner assemblage 19, 23, 24 during the brake application and subsequent release of the brake application; and hence the cam plate will continuously prevent live tang 45 of take-up clutch 42 from entering cam plate notch 58 and thus maintain clutch 42 disengaged, with the result that the take-up nut 37 will spin freely during such application and release of brakes and exert no torque on the tube. Thus when brakes are completely released, the various parts will be in the relative positions in which they are shown in the drawings except that push rod 5 will have been run a certain distance outwardly of the tube 3 and thus increased slack in the brake rigging.

If, on the other hand, slack in the brake rigging is within desired limits, the brake cylinder piston rod 65 will travel at least the aforementioned desired minimum amount, but not exceeding a desired maximum amount, in effecting engagement of the brake shoes. This amount of movement of the brake cylinder piston rod 65 will be sufficient to cause the runner assemblage 19, 23, 24 to be moved far enough leftwardly relative to the rightwardly moving tube 3 and changeover member 35 to cause the lefthand end of cam plate 52 to engage the changeover flange 34 and, through such engagement, shift said cam plate rightward relative to the runner assemblage a slight distance, such as about 1/4 inch, sufficient to cause the live tang 49 of let-out spring clutch 43 to ride up along the beveled face of the rightwardly moving notch 59 and thereby sufficiently unwrap the coils of said clutch as to disengage same; but such slight rightward movement of the cam plate 52 will be insufficient to bring the take-up spring clutch tang 45 into registry with notch 58 and hence the cam plate will maintain take-up clutch 42 disengaged. With both clutches 42, 43 disengaged, their corresponding nuts 37, 38 will be free to spin in either direction.

Consequently, when the brake cylinder 64 is vented, both nuts 37, 38 will spin freely in opposite directions on their respective threads 17, 18 and impart no torque to tube 3 as the runner assemblage is moved rightward by the power of spring 29. During the brake release, the cam plate 52 will remain the aforementioned slight distance rightward of runner assemblage 19, 23, 24 until the right-hand end of said cam plate engages the stop disc 62; whereupon its movement will be halted and the runner assemblage will continue to move rightward until end plate 23 engages said stop disc. During this latter movement, the take-up clutch tang 49 will again become aligned with the base of notch 59, but the latch 60 will have operated to prevent said tang from dropping into this notch; and hence both clutches 42, 43 will once again be disengaged.

Thus, when brakes are completely released, all parts will once again be in the relative positions in which they are shown. The push rod 5 will not have been screwed in or out of the tube 3 and hence no change in slack will have taken place.

If, however, slack in the brake rigging is excessive, the brake cylinder piston rod 65 will have to travel more than the aforementioned desired maximum amount to effect engagement of the brake shoes. Hence, the cam plate 52 will engage the changeover flange 34 and be moved rightward relative to the runner assemblage some distance greater than said slight distance; it being noted that the runner assemblage, as above noted, will continue to move leftward until the brake shoes are engaged. As the cam plate 52 moves rightward this greater distance, the let-out clutch tang 49 will successively be forced out of cam plate notch 59, as heretofore described, and thereafter the take-up clutch tang 45 will drop into cam plate notch 58. But this will not prevent leftward movement of the runner assemblage relative to the tube because the clutch 42 never prevents clockwise movement of the take-up nut 37; and hence both nuts 37, 38 will spin freely.

When brakes are released, power spring 29 will shift the runner assemblage 19, 23, 24 and thereby the housing 2 and cam plate 52 rightward relative to the tube 3. Since take-up clutch 42 is engaged and thus prevents counterclockwise rotation of take-up nut 37, the tube 3 will be rotated clockwise, through the medium of the take-up threads 17 and said nut. This will cause the push rod 5 to run inwardly of the tube 3 and reduce the linear distance between the points of connection of the push rod with the dead lever 76 and of the clevis 4 with the live lever 66 and thus effect a reduction in slack clearance between the brake shoes and wheels. Tube 3 will thus be rotated clockwise for operatively reducing slack until the rightwardly moving cam plate 52 is halted by engagement with the stop disc 62 and the runner assemblage and hence tang 45 has moved rightward relative thereto sufficiently to cause said tang to be pushed out of notch 58 by the beveled face of said notch and thus disengage take-up clutch 42; whereupon the nuts 37 and 38 will spin freely without further rotating tube 3 until the runner assemblage 19, 23, 24 moves rightward into contact with the stop disc 62. Meanwhile, as above explained, the latch 60 will prevent let-out clutch tang 49 from dropping into notch 59 and thus maintain let-out clutch 43 disengaged.

Hence, when brakes are fully released, all parts will again be in the relative positions in which they are shown in the drawings, except that the length of push rod 5 projecting exteriorly of tube 3 will have been reduced.

It will now be apparent that the amount of slack let out will be a fixed proportion (depending upon the selected leverage ratios) of the actual travel of the brake cylinder piston rod 65 because the sum of the distances A and B will increase in proportion with brake cylinder piston travel and hence with slack; and the amount of slack let out will also be influenced by the lead angle of the let-out threads 18. Since the torque required on tube 3 to let out slack is relatively small and it is desirable to let out slack at a relatively fast rate (that is, let out a considerable amount of slack during one brake application-and-release cycle), the lead of the let-out threads 18 is small so that a maximum angular degree of counterclockwise rotation of the tube 3 will be effected consistent with the torque available by the chosen force of power spring 29.

On the other hand, it will also be apparent that the amount of slack taken up will likewise be a fixed proportion of the actual travel of brake cylinder piston rod 65 and hence of the sum of distances A and B, as well as the lead angle of the take-up threads 17. The torque required to rotate tube 3 to take up slack is relatively high but the degree of take-up desired per operation is relatively small because of the relatively slow rate of brake shoe wear. Hence, the lead of the take-up threads 17 is relatively long so that the tube 3 will be rotated clockwise by the take-up nut 37 through small angular increments with the force of spring 29 being desirably multiplied to easily provide the requisite high torque.

By way of example, if the rigging is constructed to provide a nominal travel of the brake cylinder piston rod 65 of eight inches with a 10.5 to 1 lever ratio, and the control linkage relative motion (the sum of distances A and B) is one-half of the actual travel of said piston rod, then the slack adjuster 1 will operate to provide slack let-out equal to 28% of such actual travel and slack take-up of 6% of such travel. Thus, if after installing new brake shoes, brake cylinder piston rod travel happened to be only four inches, the first letout would be 28% of four inches or 1.12 inches; and the second let-out would be 28% of 5.12 inches or 1.43 inches, etc. until a piston rod travel of approximately 7¾ inches was obtained and which corresponds to the aforementioned desired minimum amount of brake cylinder piston rod travel. When brake cylinder piston rod travel is within a normal range, which is between this 7¾ inches and 8¼ inches (which corresponds to the aforementioned maximum amount of such travel), the slack adjuster 1 will operate to neither let out or take up slack. If, due to brake shoe wear, brake cylinder piston rod travel should exceed 8¼ inches, then the adjuster will operate during release of the brake application to take up slack to the extent of 6% of 8¼ inches or .495 inch, which will thus restore piston rod travel to within the above defined normal range.

It will also be noted that by increasing and decreasing the longitudinal spacing between the cam plate notches 58, 59, the normal range of desired brake cylinder piston rod travel may be increased and reduced, respectively, as desired, because such spacing defines the amount the cam plate 52 may move axially relative to the runner assemblage after the let-out clutch 43 is disengaged and before take-up clutch 42 is engaged.

Having now described my invention, what I claim as new and desire to secure by Letters Patent, is:

1. An automatic brake slack adjuster comprising a rotatable member and a rod which are operatively screw-thread connected to each other and movable longitudinally as a rigid two-part unit during a brake application; let-out nut means and take-up nut means each mating with a respective set of oppositely wound external helical threads provided on said rotatable member; let-out clutch means operative when engaged during release of a brake application to lock said let-out nut means against rotation so as to cause said rotatable member to be rotated one way to let out slack; take-up clutch means operative when engaged during release of a brake application to lock said take-up nut means against rotation so as to cause said rotatable member to be rotated the opposite way to take up slack; longitudinally movable runner means operatively connected to both of said nut means for controlling their rotation relative to said rotatable member; cam means carried by, and longitudinally shiftable relative to, said runner means for controlling engagement and disengagement of said let-out clutch means and take-up clutch means; changeover means operatively carried by said rotatable member and engageable by said cam means; stop means connected to said rotatable member; and power spring means for biasing said runner means and cam means into operative contact with said stop means when brakes are released; both of said nut means always being freely spinnable on said rotatable member upon movement of said runner means against the force of said power spring means during a brake application, and said cam means being positioned during release of the brake application to cause effective engagement of said let-out clutch means or said take-up clutch means according to whether said runner means did not or did, respectively, travel far enough against the force of said power spring means during the preceding brake application to carry said cam means into engagement with said changeover means and cause shifting of said cam means relative to said runner means.

2. A slack adjuster as claimed in claim 1, wherein the lead of the helical threads with which said take-up nut means is mated is substantially greater than the lead of the helical threads with which said let-out nut means is mated, whereby during a brake application and release cycle the slack adjuster will operate to let-out slack in large increments when slack is insufficient and will operate to take up slack in small increments when slack is excessive.

3. A slack adjuster as claimed in claim 1, wherein when brakes are fully released and said cam means and runner means are concurrently in engagement with said stop means, said cam means will be so positioned relative to said runner means as to hold said take-up clutch means disengaged thus permitting manual rotation of said rotatable member to take up slack but so positioned as to be ineffective to hold said let-out clutch means disengaged, and including latch means carried by and movable relative to said cam means, said latch means being operative while brakes are fully released to engage said stop means and thereby transmit a force from the stop means to said let-out clutch means sufficient to hold the latter disengaged for permitting manual rotation of said rotatable member to manually let out slack, whereby when brakes are fully released slack may be taken up and let out manually.

4. A slack adjuster as claimed in claim 1, in combination with a live lever operatively connected to said rotatable member so as to move the latter longitudinally but permit rotation of said rotatable member relative thereto, a control lever rockably fulcrumed on a fixed element and link-connected to the live lever, a tie rod hingedly connected to the control lever, and a housing enveloping the runner means and hingedly and non-rotatably connected to the tie rod, said housing having spline-like connection with said runner means to prevent rotation of the latter, and said housing operatively engaging said runner means, whereby said runner means will be shifted against the force of said power spring means through the medium of the live lever and tie rod and housing upon movement of the live lever during a brake application, and said housing will be returned to a normal position relative to said rotatable member upon release of the brake application through the force transmitted from the power spring means via said runner means to said housing.

5. A slack adjuster as claimed in claim 4, wherein during a brake application said runner means will always be operatively moved in a direction toward the first-mentioned rod of claim 1 by said control lever acting through the medium of said tie rod, and said rotatable member and first-mentioned rod will be operatively moved in the opposite direction by the live lever, the total amount of these two last-described movements being proportional to the degree of travel required of the live lever to effect a brake application, said cam means engaging said change-over means only if said total amount exceeds a certain value.

6. A slack adjuster comprising a non-rotatable push rod and a rotatable member which are screw-thread-connected such that upon rotation of the rotatable member said push rod will be displaced longitudinally relative to the rotatable member for varying slack, said rotatable member having two sets of helical threads which are oppositely wound, a let-out nut and a take-up nut each mated with and freely spinnable on a respective set of said helical threads during a brake application, non-rotatable runner means for controlling rotation of both of said nuts relative to said rotatable member and longitudinally movable in one direction during a brake application, thrust bearing means for permitting substantially frictionless rotation of said nuts relative to each other and relative to said runner means, stop means connected to said rotatable member, power spring means for normally shifting said runner means in the opposite direction to a release position defined by contact of said runner means with said stop means, a let-out clutch effective when engaged with said let-out nut during a brake release to prevent rotation of said let-out nut one way so as to cause rotation of said rotatable member the opposite way to effect let-out of slack, a take-up clutch effective when engaged with said take-up nut during a brake release to prevent rotation of said take-up nut said opposite way so as to cause rotation of said rotatable member said one way to effect take-up of slack, changeover means carried by said rotatable member and resiliently biased a limited distance in said opposite direction, and cam means for controlling engagement and disengagement of said clutches, said cam means normally engaging said stop means and being shiftable longitudinally relative to said runner means through operative engagement with said changeover means, said cam means being positioned longitudinally relative to said clutches during release of a brake application in a let-out position in which said let-out clutch is engaged and said take-up clutch is disengaged, or in a normal position in which both of said clutches are concurrently disengaged, or in a take-up position in which, said take-up clutch is engaged and said let-out clutch is disengaged, according to whether during movement of said runner means in said one direction against the force of said power spring means during the preceding brake application, said cam means failed to engage said changeover means, or was shifted by engagement with said changeover means not exceeding a slight distance in said opposite direction relative to said runner means or was so shifted in excess of said slight distance by said changeover means, respectively, whereby during release of the brake application said push rod will be displaced longitudinally to effect let-out of slack, or will not be displaced and hence not vary slack, or will be displaced to effect take-up of slack, respectively, until said cam means engages said stop means.

7. A slack adjuster as claimed in claim 1, wherein said cam means is in the form of a longitudinally extending cam plate having notches extending inwardly from opposite transverse sides of such cam plate and longitudinally offset substantially said slightly distance from each other, and wherein said let-out clutch means and take-up clutch means are in the form of helical springs oppositely wound about the let-out nut means and take-up nut means respectively, and wherein each of these clutching springs comprises a respective anchor tang fixedly interlocked with said runner means and a respective live tang which when engaged by a respective transverse side of said cam plate will hold the corresponding clutch means disengaged, said live tangs being capable of entering a respective one of said notches when in transverse alignment therewith as controlled by the longitudinal position of the cam plate relative to said runner means so as to condition the respective clutching spring for effective engagement.

8. A slack adjuster as claimed in claim 7, including a bell-crank-like latch rockably connected at its knee to said cam plate and rocked by engagement of one of its arms with said stop means upon movement of said runner means to its said release position for causing the other of its arms to hold said let-out clutch means disengaged.

9. A slack adjuster for a brake rigging, comprising a non-rotatable push rod and a rotatable member which are operatively screw-thread-connected such that said push rod will be displaced axially relative to said rotatable member by and upon rotation of the latter; a non-rotatable member; means for so interconnecting said members that said rotatable member and thereby said push rod is movable longitudinally by and with, but freely rotatable relative to, said non-rotatable member; non-rotatable runner means surrounding said rotatable member; let-out nut means and take-up nut means screw-threaded on oppositely wound threads on said rotatable member and freely spinnable during a brake application and movable axially relative to said rotatable member by said runner means, said let-out nut means and take-up nut means being capable when selectively effectively locked against rotation during release of a brake application to respectively cause rotation of said rotatable member one way and the opposite way during such release of the brake application, let-out clutch means for controlling such locking of said let-out nut means; take-up clutch means for controlling such locking of said take-up nut means; cam means carried by, and movable longitudinally relative to, said runner means for controlling engagement of said let-out and take-up clutch means; changeover means movable longitudinally with, said rotatable member; said non-rotatable member and thereby said rotatable member and push rod always being moved in generally one direction and said runner means always being moved in generally the opposite direction by the brake rigging during a brake application such that the total amount of such relative movement will be proportional to the degree of brake rigging movement required to effect the brake application, said cam means being carried in unison with said runner means a distance insufficient to engage said changeover means when said total amount is low in consequence of insufficient slack in the brake rigging, said cam means being moved a greater distance by said runner means and through engagement with said changeover means shifted in said one direction relative to said runner means when said total amount is high in consequence of excessive slack in the brake rigging, said let-out clutch means and said take-up clutch means being controlled by the position of said cam means relative to said runner means so as to cause such locking of said let-out nut means or said take-up nut means according to whether said cam means is not or is, respectively, shifted by said changeover means.

10. For varying slack in a rigging, a slack adjuster comprising a tubular member and a rod which are operatively screw-thread connected to each other and movable longitudinally in unison during tensioning of the rigging, a let-out nut and a take-up nut always freely spinnable during tensioning of the rigging on respective sets of oppositely wound helical threads formed externally on said member, one clutch-like means operative only when effectively engaged with said let-out nut during untensioning of the rigging to lock said let-out nut against spinning and thereby cause rotation of said member in a slack let-out direction, another clutch-like means operative only when effectively engaged with said take-up nut during untensioning of the rigging to lock said take-up nut against spinning and thereby cause rotation of said member in a slack take-up direction, longitudinally shiftable cam means for controlling effective engagement of said one and other clutch-like means, changeover means operatively moved relatively toward said cam means by and during tensioning of the rigging and disposed to operatively engage and shift said cam means when slack exceeds a predetermined amount, longitudinally movable non-rotatable runner means operatively connected to both of said nuts for controlling their longitudinal position relative to said member and having a lost-motion connection with said cam means permitting limited longitudinal movement of said cam means by said changeover means relative to said runner means, and power spring means for operatively biasing said runner means to a normal position when the rigging is untensioned, said runner means being shifted longitudinally against the force of said power spring means during tensioning of the rigging, said cam means being positioned during tensioning of the rigging to cause effective engagement of said one clutch-like means or other clutch-like means during subsequent untensioning of the rigging according to whether during such tensioning of the rigging said cam means was or was not operatively shifted through said lost motion connection by said changeover means.

11. For varying slack in a rigging, a slack adjuster comprising a tubular member and a rod which are operatively screw-thread connected to each other and movable longitudinally in unison during tensioning of the rigging, a let-out nut and a take-up nut always freely spinnable during tensioning of the rigging on respective sets of oppositely wound helical threads formed externally on said member, non-rotatable runner means movable longitudinally relative to said rotatable member one way during tensioning and the opposite way during untensioning of the rigging, said runner means being operatively connected to both of said nuts for controlling their longitudinal position relative to said rotatable member, cam means movable longitudinally in unison with the runner means during tensioning of the rigging so long as during such tensioning said runner means moves said one way less than a certain distance corresponding to a desired slack condition, changeover means engageable by said cam means for shifting the latter said opposite way relative to said runner means only when during tensioning of the rigging said runner means moves said one way more than said certain distance, power spring means biasing the runner means to a normal position when the rigging is untensioned, a let-out clutch operative when effectively engaged with said let-out nut to prevent spinning of the later during untensioning of the rigging so as thereby to cause rotation of said rotatable member in a slack let-out direction, and a take-up clutch operative when effectively engaged with said take-up nut to prevent spinning of the latter during untensioning of the rigging so as thereby to cause rotation of said rotatable member in a slack take-up direction, said clutches comprising respective one portions engaging said cam means, said cam means being positioned relative to said runner means and one portion during tensioning of the rigging to cause effective engagement of said let-out clutch or take-up clutch during untensioning of the rigging according to whether said cam means was not or was shifted said opposite way relative to said runner means by said changeover means during preceding tensioning of the rigging.

12. A slack adjuster according to claim 11, wherin said clutches are in the form of separate longitudinally spaced oppositely wound helical springs each having an anchor tang fixedly interlocked with said runner means and each having as said one portion a live tang engaging said cam means, said cam means being in the form of a cam plate having at its opposite transverse sides beveled notches which are longitudinally offset from each other such that each spring clutch will be selectively engaged when its respective live tang drops into its corresponding notch and will be disengaged when its live tang engages a respective surface of said cam plate adjacent such corresponding notch, such selective engagement of the clutches thus being controlled according to the longitudinal position of the cam means relative to the runner means.

13. For varying slack in a rigging, a slack adjuster comprising a tubular member and a rod which are operatively screw-thread connected to each other and movable longitudinally in unison during tensioning of the rigging, a let-out nut and a take-up nut always freely spinnable during tensioning of the rigging on respective sets of oppositely wound helical threads formed externally on said member, one clutch-like means operative only when effectively engaged with said let-out nut during untensioning of the rigging to lock said let-out nut against spinning and thereby cause rotation of said member in a slack let-out direction, another clutch-like means operative only when effectively engaged with said take-up nut during untensioning of the rigging to lock said take-up nut against spinning and thereby cause rotation of said member in a slack take-up direction, non-rotatable runner means operatively connected to both of said nuts and moved longitudinally relative to said member during tensioning of the rigging for controlling the longitudinal position of said nuts relative to the member, cam means longitudinally shiftable relative to said runner means for controlling effective engagement of said one and other clutch-like means, power spring means operatively biasing said runner means to a normal position when the rigging is untensioned and against the force of which said runner means is operatively shifted by and during tensioning of the rigging, and means normally spaced from said cam means and operatively moved relatively toward said cam means by and during tensioning of the rigging a distance corresponding to the existing slack condition in the rigging, the last introduced means being ineffective to contact said cam means or effective through contact therewith to shift said cam means a certain degree relative to said runner means according to whether said distance is less than or exceeds a predetermined range corresponding to a desired slack, said cam means during untensioning of the rigging being positioned to cause effective engagement of said one clutch-like means or said other clutch-like means according to whether said cam means was not shifted or was shifted said certain degree relative to said runner means during the preceding tensioning of the rigging.

References Cited in the file of this patent
UNITED STATES PATENTS

| | | |
|---|---|---|
| 1,381,932 | Redford | June 21, 1921 |
| 2,684,132 | Snyder | July 20, 1954 |
| 2,712,861 | Gaver | July 12, 1955 |
| 2,770,331 | Dorey | Nov. 13, 1956 |